Oct. 9, 1928.
C. DE MALHERBE
1,686,623
SPEED INDICATING MECHANISM FOR VEHICLES
Original Filed Feb. 24, 1925   6 Sheets-Sheet 1
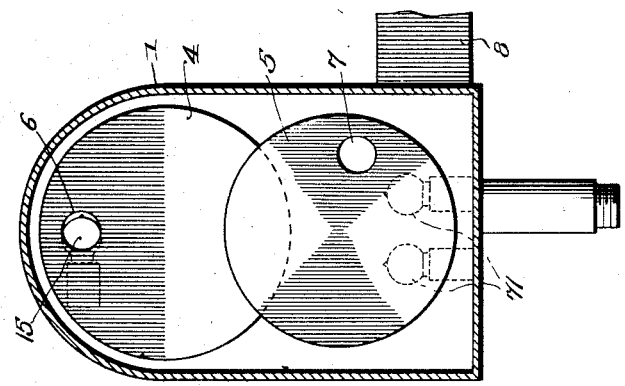
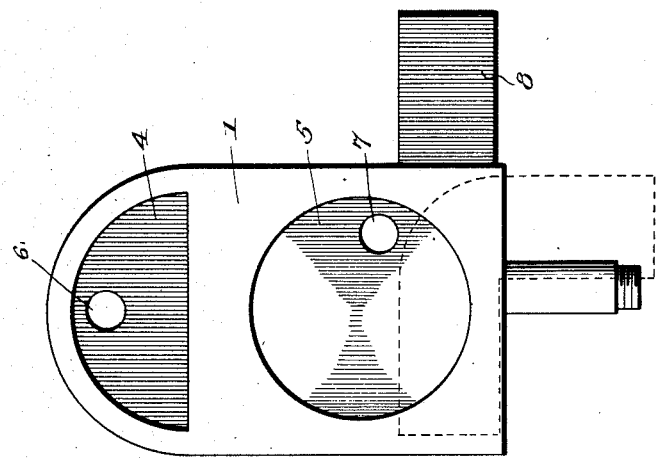
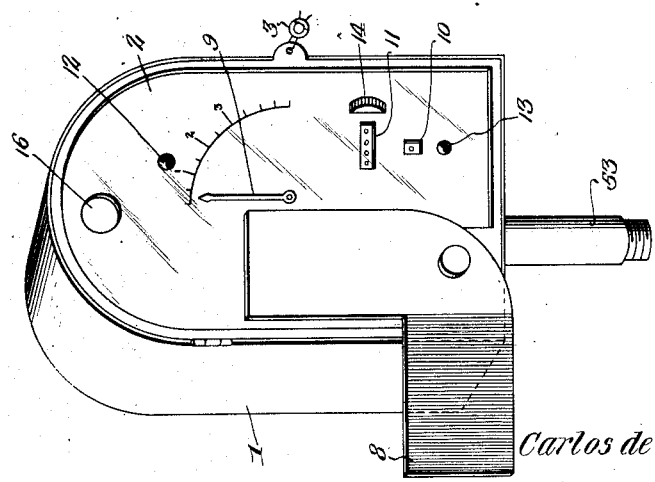
Inventor
Carlos de Malherbe,
By
Attorney

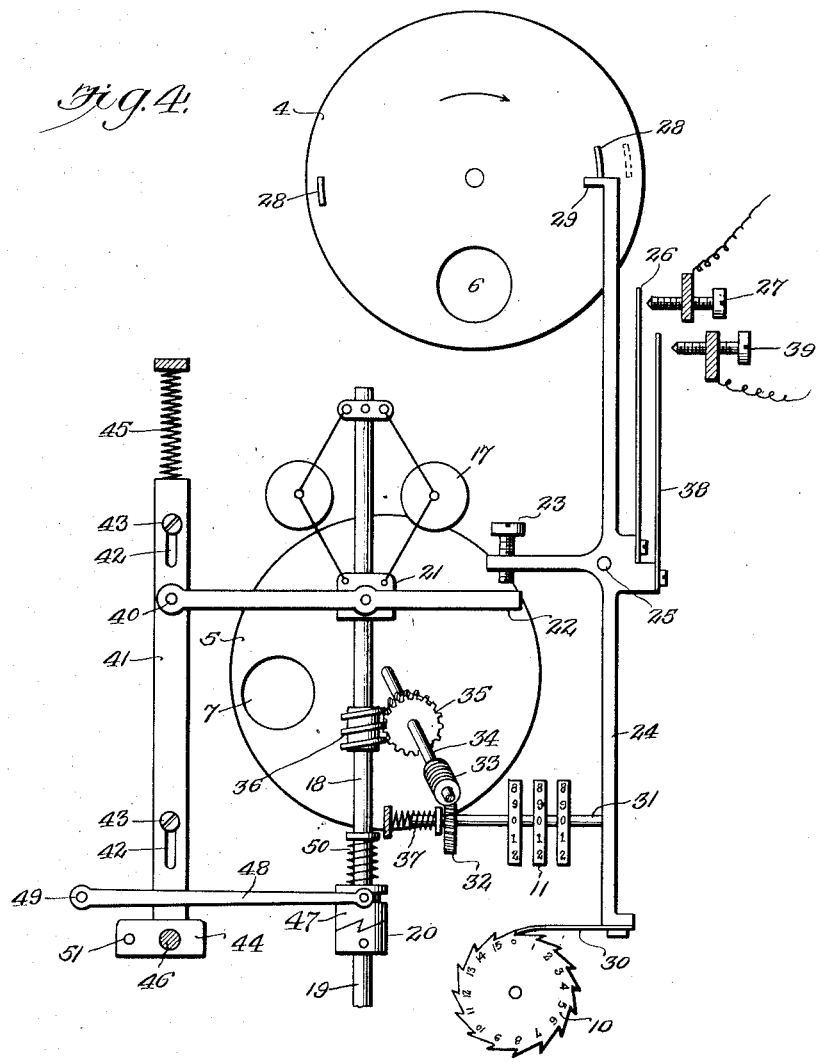

Oct. 9, 1928.   1,686,623

C. DE MALHERBE

SPEED INDICATING MECHANISM FOR VEHICLES

Original Filed Feb. 24, 1925    6 Sheets-Sheet 3

Inventor
Carlos de Malherbe,

By
Attorney

Oct. 9, 1928.  1,686,623

C. DE MALHERBE

SPEED INDICATING MECHANISM FOR VEHICLES

Original Filed Feb. 24, 1925    6 Sheets-Sheet 4

Inventor
Carlos de Malherbe,
By
Attorney

Oct. 9, 1928.
C. DE MALHERBE
1,686,623
SPEED INDICATING MECHANISM FOR VEHICLES
Original Filed Feb. 24, 1925      6 Sheets-Sheet 5
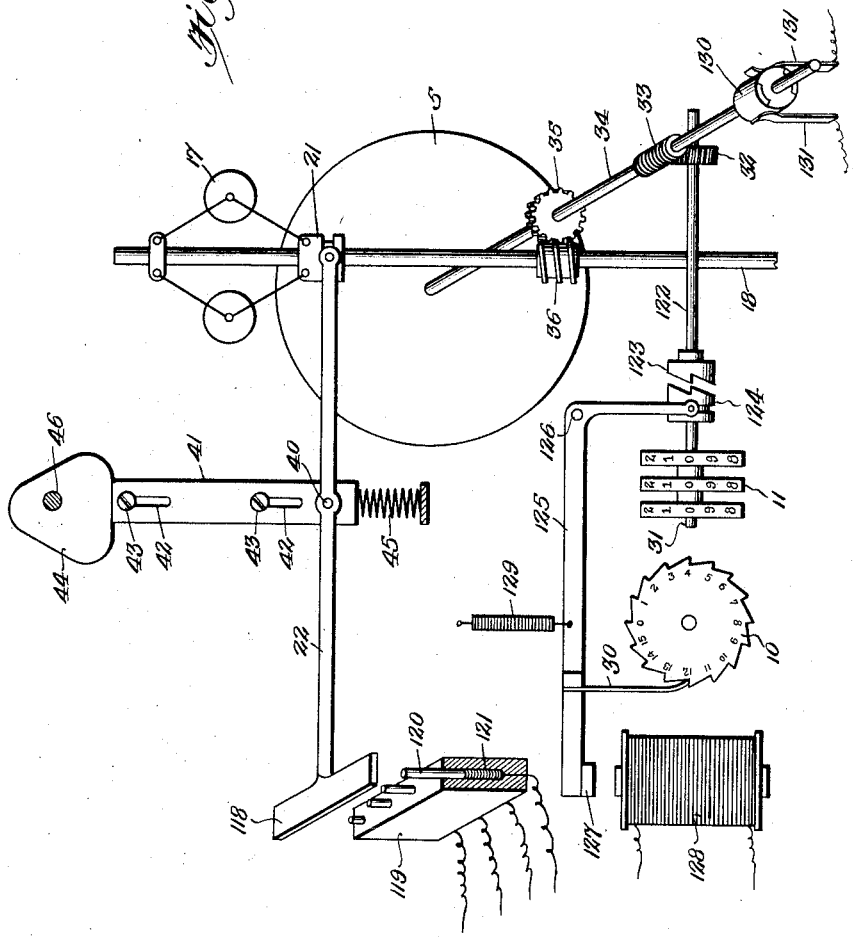
Inventor
Carlos de Malherbe,
By
Attorney Oct. 9, 1928.  1,686,623
C. DE MALHERBE
SPEED INDICATING MECHANISM FOR VEHICLES
Original Filed Feb. 24, 1925  6 Sheets-Sheet 6

Inventor
Carlos de Malherbe,
By
Attorney

Patented Oct. 9, 1928.

1,686,623

UNITED STATES PATENT OFFICE.

CARLOS DE MALHERBE, OF BUENOS AIRES, ARGENTINA.

SPEED-INDICATING MECHANISM FOR VEHICLES.

Application filed February 24, 1925, Serial No. 11,321. Renewed July 2, 1928.

This invention relates to an apparatus for indicating the speed of automobiles; and has for its object to signal and register violations of speed regulations.

The apparatus is applicable to any given radius of a city, permitting a slow speed in the centre, a higher speed in broad avenues or other main thoroughfares, in the suburbs, and a still higher speed or an unlimited speed in the open country. The limit adopted is made known to the public by means of a flag, the shaft of which effects the necessary changes in the mechanism to alter the various limits. For each limit the colour or the position of the flag is changed, whilst by night the signal is a light of a certain colour.

The apparatus is not absolutely inflexible in regard to these limits; that is to say, the reduction of the speed of the vehicle is effected or may be effected at a speed slightly in excess of the limit allowed when it is necessary to overcome some difficulty or danger.

The apparatus registers the number of violations, and this serves as a moral brake of even greater effect than a mechanical brake. In fact no apparatus which merely indicates the speed of the vehicle would fulfil the purpose of preventing excessive speeds.

The apparatus registers the total distance covered by the vehicle at excess speeds, and thus does away with the temptation for the driver to continue at an excess speed after he knows an infraction has been committed. At the same time a case of accidental infraction may be shown to have been justifiable in cases where responsibility for an accident is in question. It may readily be understood that circumstances may arise in which it is necessary to accelerate the speed in order to avoid an accident.

The apparatus warns the driver in good time when he is nearing the permissible limit. Before an infraction is actually committed a light is shown, visible only to the driver, and a bell is sounded.

On the limit being passed, it is announced to the public by means of a colored disk by day and a light by night.

The apparatus has a public indicator to show that it is working properly, consisting either of a revolving disk in the day time or a flash or intermittent lamp at night.

All the mechanism is enclosed in a box, so mounted and sealed that any interference with it may at once be apparent.

The apparatus is of small dimensions and weight, and its installation is as simple as that of an ordinary speedometer.

Essentially the apparatus which is the object of this invention comprises a box, containing a mechanism moved by a flexible transmission run from one of the wheels of the vehicle in the usual manner. This mechanism, the basis of which is a centrifugal governor, controls either mechanically or electrically the various parts including indicators, alarms, registers and reducing mechanism.

The various figures of the drawings which accompany this specification illustrate how an apparatus may be worked by mechanical action, or how it may be contrived electrically. In these illustrations:—

Figure 1 is a perspective view of the apparatus from the side facing the driver.

Fig. 2 shows the apparatus from the front.

Fig. 3 is a view similar to Fig. 2 but with the front wall of the case removed.

Fig. 4 is a diagram of the mechanism.

Fig. 9 is a diagram of the mechanism.

In all the figures, the same reference numerals indicate similar or corresponding parts.

Figure 5:
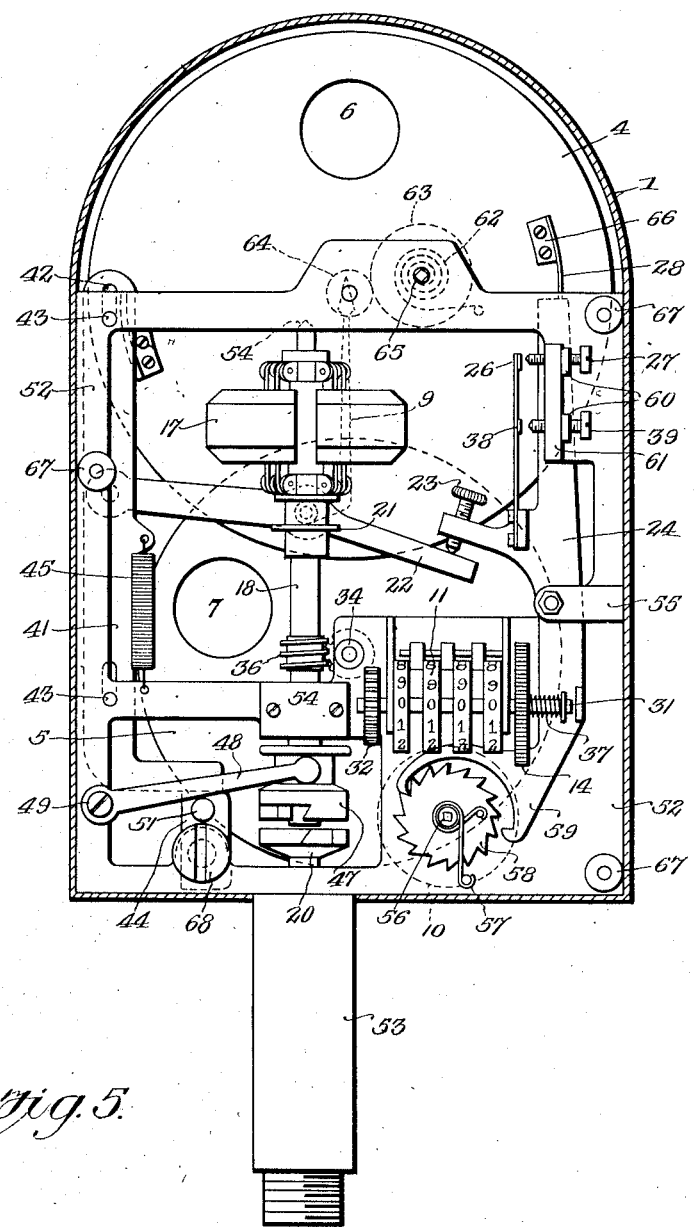
Fig. 5 shows the interior of the apparatus as seen from behind; for greater clearness the electrical part has been eliminated.

The external appearance of the apparatus, that is, the visible parts, whose function is the principal part of the invention will first be described.

The apparatus, externally shown in Figs. 1, 2 and 3, comprises a box 1 which completely encloses the mechanism. On the side of the driver, the apparatus has a small glazed door 2. Its fastening allows of the application of a leaden seal, which ensures the inviolability of the mechanism. In the front, that is the side opposite to the door, there are two openings in the box, either glazed or open, through which may be seen half of the disk 4, which signals the infractions, and the whole of the disk 5 which indicates that the apparatus is working properly. The disk 4 showing infractions is painted half red and half white. The disk 5 indicating the proper working of the apparatus is painted in alternate red and white sectors.

The disk showing infractions moves through only a half turn, and exhibits its white half when the vehicle is running normally and its red half when there is an infraction. At night this signal is given by means of a red light visible through the opening 6 in the red half of the disk 4. If the light is visible it signals the infraction.

Meanwhile the disk indicating that the apparatus is working properly revolves continuously, being connected by its axle to the mechanism of the governor, as will be seen further on. It also has a small opening 7 through which may be seen a light of a certain colour. The intermittent flashing of this light at night time indicates that the disk is revolving.

At the same time the colour of this light may be used at night as a signal to show in which of the prescribed limits the apparatus is functioning; during the day time this may be seen from the flag 8.

This flag has two arms, only one of which is visible at a time from the front of the apparatus. It is mounted on a shaft which enters the box and acts upon the mechanism which determines the action of the governor for the different speeds according to the established limits, which are signalled externally by the position of the flag or by lights of different colours.

The apparatus under consideration comprises either three speeds, or two speeds and one open speed, although it is evident that if it were necessary, arrangements could be made by the same means for four or more speed limits and an open speed.

Through the glass of the apparatus may be seen the pointer 9 which moves over a graduated scale, and indicates the speed; while the infraction register or counter 10 may be seen through an opening in the metal case of the mechanism, and the register 11 of distances run during infractions can be seen through another opening in the case.

The person authorized to wind the mechanism and to return the indicators to zero, may do so by opening the door 2, when the winding of the infraction mechanism may be done by means of a special key, through the orifice 12 of the metal case, the winding of the register of infractions can be performed with the same key through the orifice 13, and finally the register of distances run during infractions may be returned to zero by means of the thumb wheel marked 14.

The same lamp 15 which is visible through the opening in the infractions disk 4 serves also to warn the driver that he is nearing the speed limit allowed, because when the lamp is lit its light is visible through an opening 16 in the metal casing.

The diagram shown in Fig. 4 explains the interior mechanism, the illustration of same being completed by means of the inside view (Fig. 5).

With regard to Fig. 4, the mechanism comprises a controller or regulator in the form of a centrifugal governor 17 whose spindle 18 may be connected or disconnected with the shaft 19 by means of the toothed clutch 20. The shaft 19 is driven from the flexible or other transmission which derives its movement from one of the wheels of the vehicle, preferably one of the front wheels, so that any accelerations which there may be when the driving wheels skid need not be recorded.

The sliding collar 21 of the governor works a lever 22 in the usual manner. This lever, on the side opposite to its pivot, may come into contact with the screw 23 in the oscillating arrangement 24, which, working on its pivot 25, operates when in a certain position the parts which provide the warning, and other devices and the speed-reducing means.

On reaching nearly to the permissible limit, the oscillator 24 moved by the lever 22, makes a contact between the spring 26, which is fastened to it, and the screw 27, thus closing an electric circuit in which are included the lamp 15 and a suitable alarm, such as an electric bell.

If the speed be still further increased, the oscillator throws the infraction disk 4 into view, and sets in motion the infractions register 10, and the meter 11 showing the distance run during the infractions. With this object, the infraction disk carries two stops 28, placed at 180° apart and at different distances from the centre. One or the other of these stops always rests on the extremity 29 of the escapement of the oscillator.

When there is no infraction, the stop nearest to the centre is in action. (See Fig. 4.) When the oscillator is displaced towards the right-hand side, this stop is released, and the disk makes a half turn in the direction of the arrow, whereupon the other stop comes to rest on the oscillator (the position indicated by dotted lines in Fig. 4). The disk turns by means of a spring, not shown in Fig. 4, or by any other suitable arrangement.

The register 10 is represented in this diagram by a ratchet wheel, on which works a pawl or a flat piece of spring 30 attached to the oscillator, and each time an infraction is committed, the wheel is moved forward one notch.

The meter 11 showing the distances run at excess speed, which may be of any known system desired, is driven by a shaft 31, carrying a gear 32, which may or may not mesh with a worm gear 33 on the horizontal shaft 34 driven by the pinion 35, which latter meshes with the worm 36 on the shaft or spindle 18 of the regulator.

The shaft 31 of the register or meter 11 is movable, so that, according to its position the pinion 32 may mesh or not mesh with the worm 33. An opposing spring 37 pushes this shaft 31 against the oscillator. In a certain position the oscillator overcomes the resistance of the spring, and brings the pinion 32 into engagement with the worm 33, thus putting the register 11 into operation during the whole time that the speed of the vehicle exceeds the prescribed limit.

If the speed is still further increased, an electric circuit is closed, which puts into operation any suitable form of speed-reducing device, by bringing the spring 38, attached to the oscillator, into contact with the screw 39.

When the speed is decreased, the circuit controlling the reducing device is first interrupted, then the pinion of the meter 11 for registering the distance run under excess speed comes out of gear, the pawl 30 moves back to pick up another tooth of the ratchet wheel 10 of the infractions register, in case a further increase above the speed limit should occur, the escape 29 releases the stop, the disk 4 revolves until its white portion is again visible, and finally the circuit of the lamp and the bell is broken.

The different speed limits and the open speed are obtained by the following means: By moving the centre of oscillation of the lever 22 which operates the oscillator the arrangement is so altered that for a given position of the extremity of said lever, the collar or slide 21 of the governor will be moved higher or lower as the case may be, that is, its action will be affected by the different speeds established beforehand. With this object the pivot 40 of the lever 22 forms part of a sliding piece 41 provided with vertical guide slots 42 through which pass screws 43 that fasten it to the framework.

The lower end of this sliding piece 41 rests on the cam 44, and the other end, or any part of it, receives the impulse of a spring 45. The cam 44 is fixed to the shaft 46 of the flag.

In the present arrangement, this cam gives, according to its position, three different heights, corresponding to three speed limits by which the governor is actuated..

A peculiarity of the cam resides in the fact that the lowest position lies between the two other positions, so that in order to pass from the second to the third speed it is necessary to revert to the first, thus preventing the driver from cheating the ordinance by passing on to the maximum speed when he supposes nobody is looking.

Open speed, or the freedom to go at any speed, may be obtained by disconnecting the governor by means of the clutch 20. The movable member of this clutch is mounted on the shaft 18, and has a collar 47 which is engaged by the arm 48 pivoted at its other end on a pin 49 fixed to the framework. A spring 50 serves to maintain the parts normally coupled. The lifting of the arm is effected by means of a stud 51 which may be fixed to the cam 44 at the point corresponding to the third speed.

Finally, the same horizontal shaft 34 which operates the register carries the disk 5 which shows that the apparatus is in proper working order, so that when the vehicle is running on the open speed the disk stops. But as the open speed is indicated by a particular position of the flag 8, if the disk is stopped when the flag is not in that position, it is a signal of some irregularity in the working of the apparatus.

Fig. 5 shows one way of arranging the mechanism just described. The essential parts already described bear the same numbers. As may be seen, the mechanism is enclosed in the box 1 and mounted on a framework 52 of appropriate design, properly secured to the box, the whole supported by the lower tube 53, which permits of the apparatus being securely fastened in its place. Through this tube passes the flexible transmission, which is not shown in the drawing, which drives the governor through the clutch 20. The shaft 18 of the governor works in suitable bearings 54.

The pivot of the oscillator is supported at two points 55 provided for the purpose in the framework.

The register 10, the numbered dial of which is indicated by a dotted circle is secured to a shaft 56, with a square-section end for a key, so that the spring of the register may be wound. The register can only move one notch at a time, owing to its being provided with an anchor escapement, the ratchet wheel 58 of which is mounted on the shaft 56, the anchor 59 itself forming the extreme end of the oscillator.

The meter 11 for registering the distance run whilst infraction is being committed has a thumb wheel 14 which serves to return it to zero. The purpose of the screw 23 of the oscillator is to facilitate the adjustment of the mechanism to the exact speed required.

The two contact screws, 27 and 39 are screwed into metal pieces 60, from which run the insulated wires supported on a piece of insulating material 61 fastened to the framework.

The infraction disk 4 is represented as worked by a spring 62, which moves a cogwheel 63, which gears in its turn with the pinion 64 on the axle of the disk. The shaft 65 of the gear 63 is squared off at the end to take the winding key. The stops 28 on the disk allow of a certain amount of adjustment on account of a peculiar arrangement, which consists in giving them the form of a leaf secured to the disk by a part 66 which is flanged back. Adjustment is effected by curving this leaf more or less, as required. The framework of the mechanism also supports the plate which covers the mechanism on the door side. The showing in Fig. 5 represents the mechanism without this plate. All that can be seen are its supports 67, into which the fastening screws are driven.

The shaft of the cam 44 ends in front of this plate in a coupling device 68, the complemental part 69 of which is fixed to the short shaft of the flag which revolves in an aperture of the door. This arrangement makes it unnecessary to dismount the flag when the door of the apparatus has to be opened. The pointer 9 of the speedometer is shown in dotted lines, because it is behind the plate enclosing the mechanism. It is actuated directly by the collar 21 of the governor, thus showing continuously the speed of the vehicle.

I will now describe the electrical system, in which the meters, indicators etc. are exactly the same as those in the mechanical system, the difference between the systems lying solely in the fact that in the electrical system the meters are set in motion by means of an electric relay. The description of this system may also be used as an example of certain variations in the disposition of the indicators. This system further permits the use of the mechanism of an ordinary speedometer for automobiles as the element of control, and in this way the apparatus may serve as a register of distance travelled.

Figure 8:
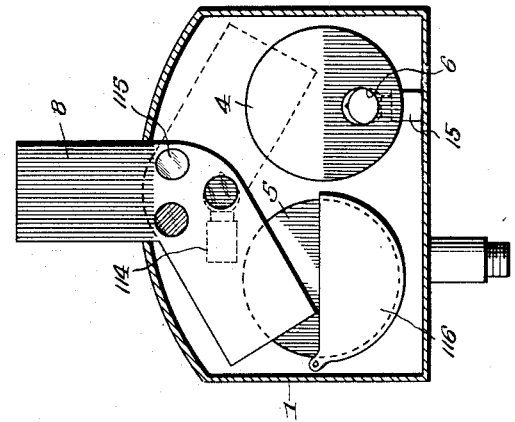
Fig. 8 is a similar view, with the covering removed.
Figure 7:
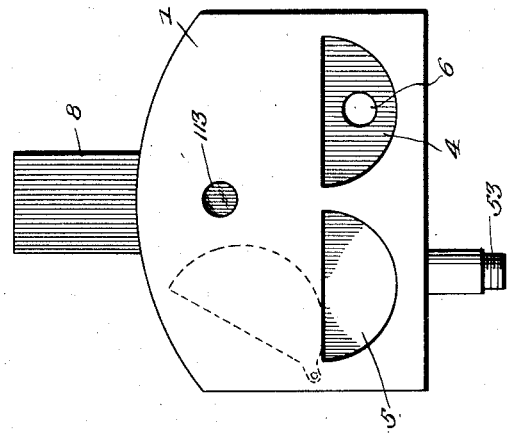
Fig. 7 is a front view of same.
Figure 6:
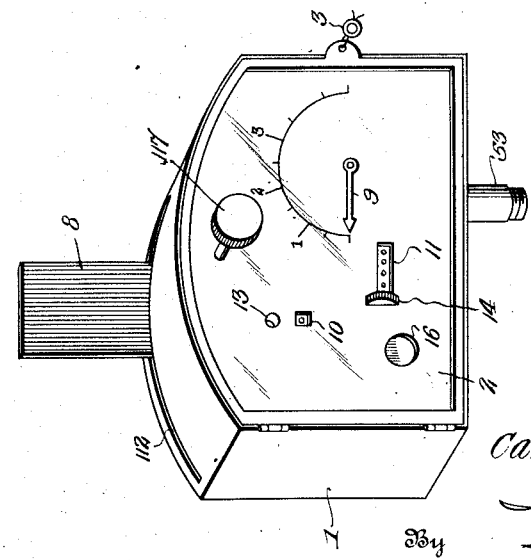
Fig. 6 shows a perspective view of the apparatus equipped with an electrical operating system.

The external appearance of the apparatus (whose parts where equivalent to those of the mechanical apparatus bear the same reference numbers) may be seen in Figs. 6, 7 and 8.

A box 1 provided with a glass door 2 encloses the mechanism. A leaden seal 3 prevents any violation of the apparatus. Through the apertures in the front may be seen the infraction disk 4, and the indicator 5 which shows the mechanism to be in working order. The two-armed flag 8 shows one of its arms or neither, above the top of the apparatus, through a slot 112 in the same. The infraction disk has an aperture 6, in the half coloured red, through which may be seen the infraction lamp 15.

Through an aperture 113 in the front of the apparatus may be seen a light of a certain colour, corresponding to the position of the flag. Behind the flag is a white lamp 114 burning continuously, and the flag itself has three openings 115 glazed in green, white and red, for example, respectively. This light shows in flashes which are produced by a commutator driven from the shaft of the governor, as will be described later on. At night time this light fulfils three purposes, as may be seen: that the speed limit has been exceeded; that the electrical part is in working order, and that the governor is working.

To give the last indication in the daytime there is the disk 5, and to indicate that the electrical part of the apparatus is working properly during the day there is an oscillating shutter 116 in front of the disk, which swings, disclosing the disk, under the impulse of an electro-magnet which will be described further on. On the side of the driver may be seen, through the glass in the door, as in the apparatus first described, the pointer 9 of the speedometer, which moves over a graduated scale, the counter of infractions 10, the register 11 of distances run during infractions, the keyhole 13 for the winding key of the counter 10, the wheel 14 for returning the counter 11 to zero, and the glazed aperture 16 for the pilot light. The shaft of the flag passes through the upper part of the door, and has at its outer end a removable knob 117 by which to set it. The keyhole for the key for winding the infraction disk is omitted, because this disk is now worked by electricity. As in the mechanical system, a diagram of the mechanism is shown (Fig. 9) which makes it easy to understand its working. 17 is the centrifugal governor, 18 the shaft connected directly to the transmission from the movement of the wheels. The sliding collar 21 of the governor moves the lever 22 oscillating on its pivot 40, supported by the slide 41. This last piece has slats 42 and screws 43 which fix and guide it. The shaft 46 of the flag has a triangular cam 44 which bears on the end of the slide, supported at the other end by a spring 45. The cam is eccentric with regard to the shaft 46, that is to say, each side of it is at a different distance from the shaft, so that, in accordance with the position of the flag, the slide is moved up or down, and, as a consequence, the pivot or fulcrum 40 of the lever also, thus obtaining, as with the first apparatus, a movement of the said lever corresponding to three separate speeds.

The end of this lever is in the form of a horizontal blade 118. Below this is an insulating piece 119 in which move four small rods or pins 120 of different heights, pushed upwards by means of small springs 121. From each of these pins, which act as contacts, runs a wire the purpose of which will be explained when describing the electrical connections. When this end of the lever comes down, the blade 118 comes first into contact with the highest pin, then with the second, the third and the fourth, according to their decreasing height, establishing with each in turn an electrical contact whose action will be described later on.

On the shaft 18 of the governor there is a worm 36, which gears with a pinion 35 fixed to the horizontal shaft 34, which also carries a screw 33 meshing in turn with a pinion 32 on another horizontal shaft 122. At the end of shaft 122 there is a toothed coupling piece 123 which may come into contact with and turn a similar piece 124 sliding on the shaft 31 of the register 11 of distances run during infractions. An angular lever 125, whose pivot 126 is in the elbow, is forked at the end of its vertical arm to engage the circular groove in the sliding piece 124. The horizontal arm of the lever 125 has a horizontal iron armature 127, which is attracted by the electro-magnet 128. An opposing spring 129 tends to keep it lifted up. Near the end of this arm is a spring pawl 30 which moves the wheel of the infractions register 10 notch by notch.

The horizontal shaft 34 driven by the shaft of the governor, has at its rear extremity the disk 5 painted in coloured sectors, indicating the proper working of the apparatus. The other extremity has a rotary commutator 130 comprising a cylinder of insulating material which carries two conducting sectors in electrical connection one with the other. By means of two fixed friction contacts 131 an electric circuit is opened and closed alternately in a continuous manner, owing to the conducting and non-conducting sectors passing alternately into contact with the two fixed contacts 131.

In this type of apparatus it is to be noted that the lever 22 of the governor has no other function than that of closing the electric circuits which control the devices previously mentioned. The shaft 122, which at the proper time works the meter 11, turns continuously, and at the moment when the lever 22 closes the corresponding circuit, the electro-magnet 128 couples up the clutch 123—124 and sets the meter in movement. Simultaneously one notch of the counter 10 has been advanced.

Figure 10:
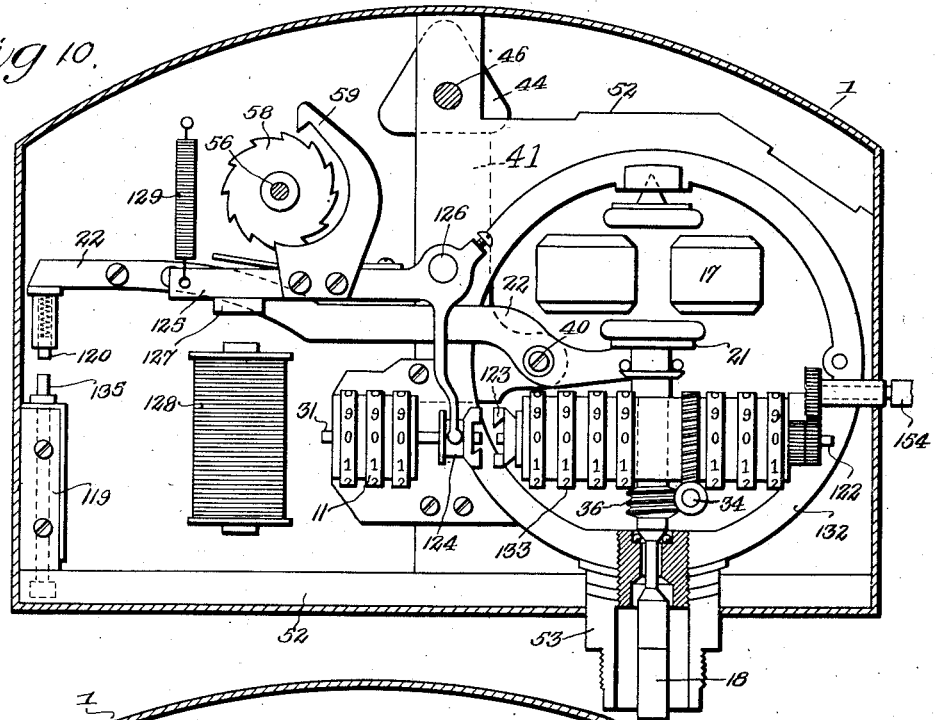
Fig. 10 is a view of the interior of the apparatus, seen from behind, with certain electrical parts removed for greater clearness.
Figure 11:
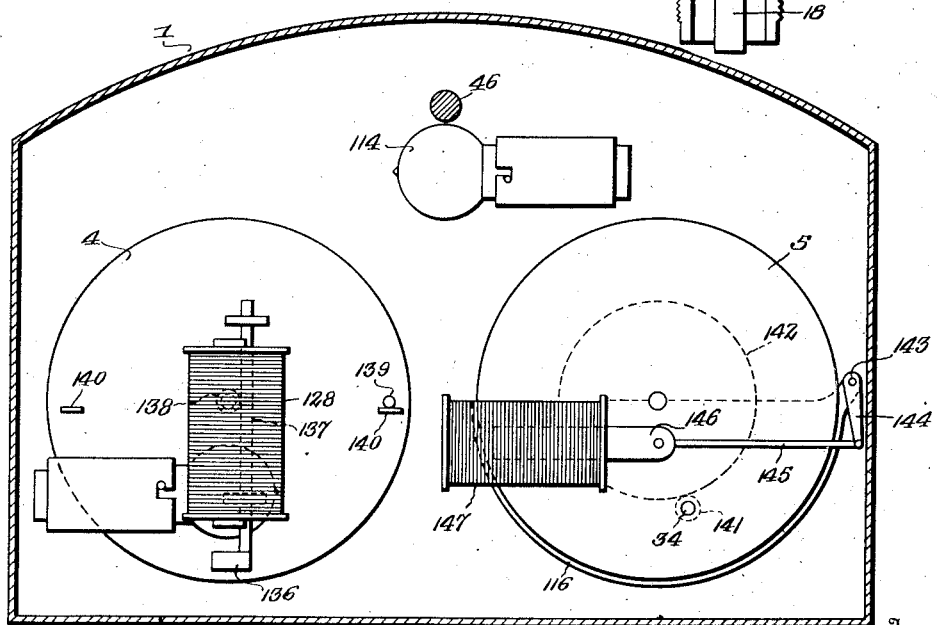
Fig. 11 is an interior view of the apparatus showing only the electrical parts.

Figs. 10 and 11 illustrate a manner of constructing the system diagrammatically represented in Fig. 9. In Fig. 10 the mechanical parts may be seen, and in Fig. 11 the electric action of the disk 4 and of the fan.

As in the first apparatus described, the box 1 encloses a framework 52 supported by the tube 53, through which passes the flexible transmission leading to the shaft 18 of the governor 17. In this construction it has been sought to show the possibility of utilizing an ordinary commercial speedometer and mileage-meter. To this end the framework 52 forms a circular lodgement to which the case 132 of the speedometer is secured. This last comprises the centrifugal governor 17, the external speed indicator and the register of kilometres 133, furnished with a knob 154 for returning it to zero. The horizontal shaft which works this register already exists in this speedometer, and all that is necessary is to lengthen it in order to add the disk 5, or a pinion which shall operate this disk and the rotary commutator 130. The register 11 of distances run during infractions has been attached to a prolongation of the shaft of the ordinary register of kilometres, placing at the extremity of the shaft the coupling 123—124.

Suitable arms on the sliding piece 41 carry the bearings in which is mounted the pivot 40 of the lever 22, one of the extremities of which terminates in a curved piece which engages the collar 21 of the governor. Differing from the arrangement shown in Fig. 9 in Fig. 10 the other extremity of the lever 22 carries the four small spring pins 120, whereas the insulating piece 119 carries four screws 135 of varying heights.

The lever 125, its pivot 126, the armature 127, the electro-magnet 128 and the spring 129 are unchanged. As in the first apparatus described, the counter of infractions 10 has a spring, not shown in the figure, a ratchet wheel 58 and an anchor escape 59 attached to the lever 125.

In Fig. 10 may also be seen the cam 44 and its shaft 46. The mechanism of the disk 4 is also moved by an electro-magnet 128, and consists of an iron armature 136 (Fig. 11) suitably guided and attached to a small rack 137 which engages with the pinion 138 of the disk. The sliding range of the rack is so calculated as to give a half turn to the disk, this movement being limited exactly by means of the stop 139 on the disk, when it touches one of the fixed stops 140.

The disk 5 revolves continuously, driven by the shaft 34 and the play of the gearing composed of the pinion 141 mounted on the shaft 34 and the toothed wheel 142 fixed on the shaft of the disk.

The shutter 116 is in the form of a semicircle fixed at one end thereof to a small rock shaft or stud 143 which carries a small crank 144 the extremity of which is connected by a rod 145 to an iron core 146 which slides into the bobbin 147. When this bobbin is excited the iron core is drawn into it and the fan is caused to swing upward, thus uncovering the disk.

I claim:

1. Speed-indicating mechanism, comprising a driving shaft; a governor thereon; a transmission shaft; gearing connecting the two shafts; a register; a register shaft; a normally-open driving connection between the transmission shaft and the register shaft; a member under the direct control of the governor; and an element under the control of said member for closing said driving connection.

2. Speed-indicating mechanism, comprising a driving shaft; a governor thereon; a transmission shaft; gearing connecting the two shafts; a register; a register shaft; a normally-open gear connection between the transmission shaft and the register shaft; and a rocker operated by the governor for closing said gear connection.

3. Speed-indicating mechanism, comprising a driving shaft; a governor thereon; a transmission shaft; gearing connecting the two shafts; a register; a register shaft; a normally-open gear connection between the transmission shaft and the register shaft; and a rocker to which said register shaft is attached for moving that shaft bodily into position to close said gear connection, said rocker being operable by the governor.

4. Speed-indicating mechanism, comprising a driving shaft; a governor thereon; a transmission shaft; gearing connecting the two shafts; a register; a register shaft; a normally-open gear connection between the transmission shaft and the register shaft; a rocker to which said register shaft is attached for moving that shaft into position to close said gear connection; and a lever movable by the governor into position to engage and operate the rocker.

5. Speed-indicating mechanism, comprising a driving shaft; a governor thereon; a transmission shaft; gearing connecting the two shafts; a register; a register shaft; a normally-open gear connection between the transmission shaft and the register shaft; a rocker to which said register shaft is attached for moving that shaft into position to close said gear connection; a lever movable by the governor into position to engage and operate the rocker; and means for shifting the position of the fulcrum of the lever to vary its movement by the governor.

6. Speed-indicating mechanism, comprising a driving shaft; a governor thereon; a transmission shaft; gearing connecting the two shafts; a register; a register shaft; a normally-open gear connection between the transmission shaft and the register shaft; a rocker to which said register shaft is attached for moving that shaft into position to close said gear connection; a lever movable by the governor into position to engage and operate the rocker; a vertical support whereon said lever is fulcrumed; and means for moving said support endwise to vary the movement of the lever by the governor.

7. Speed-indicating mechanism, comprising a driving shaft; a governor thereon; a counter; a rocker to control the operation of the counter; a lever movable by the governor into position to engage and actuate the rocker; a vertical support whereon said lever is fulcrumed; and means for moving said support endwise to vary the movement of the lever by the governor.

8. In a speed-indicating mechanism comprising a driving shaft, a governor driven thereby, a register, a register shaft, a normally-open driving connection between the two shafts, a controlling lever connected to the governor for actuation thereby, and an element under the control of said lever for closing said driving connection; a vertically movable support whereon the controlling lever is fulcrumed, and means for adjusting the position of said support to regulate the movement of said lever by the governor.

9. In a speed-indicating mechanism comprising a driving shaft, a governor driven thereby, a register, a register shaft, a normally-open driving connection between the two shafts, a controlling lever connected to the governor for actuation thereby, and an element under the control of said lever for closing said driving connection; a vertically movable support whereon the controlling lever is fulcrumed, and a cam for adjusting the position of said support to regulate the movement of said lever by the governor.

In testimony whereof I affix my signature.

CARLOS DE MALHERBE.